US012035456B2

(12) United States Patent
Imai et al.

(10) Patent No.: US 12,035,456 B2
(45) Date of Patent: Jul. 9, 2024

(54) MAGNETO-OPTICAL TRAP METHOD AND APPARATUS USING POSITIVE AND NEGATIVE G-FACTORS

(71) Applicants: NIPPON TELEGRAPH AND TELEPHONE CORPORATION, Tokyo (JP); RIKEN, Saitama (JP)

(72) Inventors: Hiromitsu Imai, Tokyo (JP); Tomoya Akatsuka, Tokyo (JP); Katsuya Oguri, Tokyo (JP); Atsushi Ishizawa, Tokyo (JP); Hideki Gotoh, Tokyo (JP); Hidetoshi Katori, Saitama (JP); Masao Takamoto, Saitama (JP)

(73) Assignees: NIPPON TELEGRAPH AND TELEPHONE CORPORATION, Tokyo (JP); RIKEN, Saitama (JP)

( * ) Notice: Subject to any disclaimer, the term of this patent is extended or adjusted under 35 U.S.C. 154(b) by 0 days.

(21) Appl. No.: 18/461,176

(22) Filed: Sep. 5, 2023

(65) Prior Publication Data

US 2023/0422386 A1 Dec. 28, 2023

Related U.S. Application Data

(62) Division of application No. 16/799,626, filed on Feb. 24, 2020, now Pat. No. 11,800,629.

(30) Foreign Application Priority Data

Feb. 26, 2019 (JP) ................................ 2019-032461

(51) Int. Cl.
*H05H 3/02* (2006.01)
*G04F 5/14* (2006.01)
*G21K 1/093* (2006.01)

(52) U.S. Cl.
CPC .............. *H05H 3/02* (2013.01); *G04F 5/145* (2013.01); *G21K 1/093* (2013.01)

(58) Field of Classification Search
CPC .......... H05H 3/02; G21K 1/093; G21K 1/006; G04F 5/145
(Continued)

(56) References Cited

U.S. PATENT DOCUMENTS 10,504,033 B1 * 12/2019 King ...................... G06N 10/40
2009/0272887 A1 11/2009 Fatemi et al.
(Continued)

FOREIGN PATENT DOCUMENTS

WO 96/25835 A1 8/1996

OTHER PUBLICATIONS

Bennets et al., "Steady-State Magneto-Optical Trap with 100-Fold Improved Phase-space Density", Physical Review Letters, American Physical Society, Dec. 1, 2017, pp. 223202-1-223202-6.
(Continued)

*Primary Examiner* — Kiet T Nguyen
(74) *Attorney, Agent, or Firm* — WOMBLE BOND DICKINSON (US) LLP

(57) ABSTRACT

A magneto-optical trap method including applying a magnetic field to an atom encapsulated in a vacuum vessel and having a nuclear spin of not less than 3/2 by using an anti-Helmholtz coil. Then generating a laser beam including a first laser beam detuned from a first resonance frequency when the atom transits from a total angular momentum quantum number F in a ground state to a total angular momentum quantum number F'=F+1 in an excited state, and a second laser beam detuned from a second resonance frequency when the atom transits from the total angular
(Continued)

momentum quantum number F in the ground state to a total angular momentum quantum number F'=F−1 in the excited state.

4 Claims, 11 Drawing Sheets

(58) Field of Classification Search
USPC .......................................................... 250/251
See application file for complete search history.

(56) References Cited

U.S. PATENT DOCUMENTS

| | | | | |
|---|---|---|---|---|
| 2014/0016118 | A1 | 1/2014 | Compton et al. | |
| 2018/0101139 | A1 | 4/2018 | Larsen et al. | |
| 2020/0116623 | A1 * | 4/2020 | Cooper-Roy | G02B 21/32 |
| 2023/0297872 | A1 * | 9/2023 | Semo | H01S 3/042<br>716/100 |

OTHER PUBLICATIONS

Campbell et al., "The absolute frequency of the 87Sr optical clock transition", Metrologia, vol. 45, 2008, pp. 539-548.
Koller et al., "Transportable Optical Lattice Clock with 7x10-17 Uncertainty", Physical Review Letters, Feb. 17, 2017, American Physical Society 2017, pp. 073601-1-073601-6.
Mukaiyama et al., "Recoil-Limited Laser Cooling of Sr. Atoms near the Fermi Temperature", Physical Review Letters, The American Physical Society, vol. 90, No. 11, Mar. 21, 2003, pp. 113002-1-113002-4.
Riehle, Fritz, "Optical Clock Networks", Nature Photonics, vol. 11, Jan. 3, 2017, pp. 25-31.
Takano et al., Geopotential measurements with synchronously linked optical lattice clocks, Nature Photonics, vol. 10, Oct. 2016, pp. 662-668.
Ushijima et al., "Cryogenic Optical Lattice Clocks", Nature Photonics, vol. 9, Feb. 9, 2015, pp. 185-189.

* cited by examiner

RELATED ART

RELATED ART

RELATED ART

MAGNETO-OPTICAL TRAP METHOD AND APPARATUS USING POSITIVE AND NEGATIVE G-FACTORS

BACKGROUND OF THE INVENTION

The present invention relates to an improvement of the atomic density of a narrow-line magneto-optical trap apparatus.

Recently, the research of an optical atomic clock such as an optical lattice clock and an ion clock using an optical frequency has extensively been made, and the clock accuracy has reached the order of $10^{-18}$ (literature 1: Ichiro Ushijima, Masao Takamoto, Manoj Das, Takuya Ohkubo, and Hidetoshi Katori, "Cryogenic optical lattice clocks", Nature Photonics, VOL. 9, pp. 185-189, 2015). The abovementioned clock has already surpassed the accuracy of 133 cesium (Cs) atomic clock that is used to define the second at present by two orders of magnitude, and is nominated as a candidate for a next-generation time/frequency standard. An optical clock network constructed by connecting these high-accuracy atomic clocks on commercial optical fiber networks can be applicable to geodesy such as altitude mapping and communication (literature 2: Fritz Riehle, "Optical clock networks", Nature Photonics, VOL. 11, pp. 25-31, 2017, literature 3: Tetsushi Takano, Masao Takamoto, Ichiro Ushijima, Noriaki Ohmae, Tomoya Akatsuka, Atsushi Yamaguchi, Yuki Kuroishi, Hiroshi Munekane, Basara Miyahara, and Hidetoshi Katori, "Geopotential measurements with synchronously linked optical lattice clocks", Nature Photonics, VOL. 10, pp. 662-666, 2016). Also, for the purpose of measuring physical quantities in various locations, a transportable optical clock that is made transportable by downsizing the clock system has been developed (literature 4: S. B. Koller, J. Grotti, St. Vogt, A. Al-Masoudi, S. Dorscher, S. Hafner, U. Sterr, Ch. Lisdat, "Transportable Optical Lattice Clock with $7\times10^{-17}$ Uncertainty", PHYSICAL REVIEW LETTERS, 118, 073601, 2017). Thus, the optical atomic clocks are attracting attention from the practical aspect.

An atomic clock is operated through various steps such as atomic cooling/trapping and spectral observation. Uncertainties such as a blackbody radiation shift and a light shift determine the clock accuracy. To decrease these uncertainties, it is necessary to precisely control each step. On the other hand, the whole clock system is desirably downsized in order to practicalize an optical clock network and a transportable optical clock as described above. When taking a laser system as an example, however, it is necessary to simultaneously control about 10 lasers, so the size of the system tends to increase. Since clock systems are complicated as described above, there may still be much room for improvement. Under the circumstances, attention will be paid to a narrow-line MOT (Magneto-Optical Trap) that is used to cool and trap atoms.

First, the operation principle will briefly be explained below based on an 87 strontium optical lattice clock (literature 1). Initially, Zeeman cooling and the MOT are performed on an 87 strontium (${}^{87}$Sr) atomic gas heated to about 400° C. in an ultra-high vacuum, thereby cooling and trapping atoms. The temperature limit of atoms cooled by the MOT is proportional to the linewidth of a transition used, so atoms can be cooled more by using a transition having a narrow linewidth. In an actual system, the MOT is separately performed by two stages. In the first-stage MOT, atoms are cooled and trapped to about 1 mK by using a transition having a linewidth of a few tens of MHz. In the second-stage MOT (narrow-line MOT), the atoms are cooled and trapped to a few μK by using a transition having a few kHz (literature 5: Takashi Mukaiyama, Hidetoshi Katori, Tetsuya Ido, Ying Li, and Makoto Kuwata-Gonokami, "Recoil-Limited Laser Cooling of ${}^{87}$Sr Atoms near the Fermi Temperature", PHYSICAL REVIEW LETTERS, 90, 113002, 2003). Then, a laser for forming an optical lattice is switched on while switching off the laser for the narrow-line MOT, thereby trapping the atoms in an optical lattice potential of about 10 μK. The spin state of the atoms captured in the optical lattice is polarized, and the spectrum is observed by irradiating the atoms with a clock laser after that. The clock laser is stabilized to a narrow-linewidth cavity using low-expansion glass or the like, but the frequency drifts as the cavity gradually warps. Therefore, the clock is operated by stabilizing the frequency of the clock laser, which is kept resonant with the clock transition of the strontium atoms.

Next, the narrow-line MOT (MOT using a J=0→J'=1 transition) of the above-described strontium optical lattice clock will be explained (literature 5). FIG. 9 shows a transition diagram to be used in the related narrow-line MOT. Trapping and cooling of atoms are normally performed by using a trapping beam 102, and a repumping beam 103 for returning atoms coming off the cooling cycle during trapping to the cooling cycle. The trapping beam 102 excites a transition between ${}^1S_{J=0}$ (F=9/2) and ${}^3P_{J'=1}$ (F'=11/2), and the repumping beam 103 excites a transition between ${}^1S_{J=0}$ (F=9/2) and ${}^3P_{J'=1}$ (F'=9/2). Accordingly, the trapping beam 102 will be called an F'=11/2 laser, and the repumping beam 103 will be called an F'=9/2 laser. ${}^1S_{J=0}$ and ${}^3P_{J'=1}$ will respectively be denoted by ${}^1S_0$ and ${}^3P_1$ hereinafter. Note that J and J' are respectively the total angular momentum quantum numbers in the ground state and the excited state related to a fine structure, and F and F' are respectively the total angular momentum quantum numbers in the ground state and the excited state related to a hyperfine structure.

The energy state between ${}^1S_0$ (F=9/2) and ${}^3P_1$ (F'=11/2) of an atom in a magnetic field will be explained with reference to FIG. 10. A quadrupole magnetic field in which the direction of the magnetic field is reversed at x=0 is formed by using an anti-Helmholtz coil (not shown). In this case, magnetic sublevels $m_F$ and $m_{F'}$ in the ${}^1S_0$ state and the ${}^3P_1$ state cause Zeeman splitting. The magnitude of Zeeman splitting caused by a magnetic field is proportional to the magnitudes of $m_F$ and $m_{F'}$ and a g-factor, and it is known that the Zeeman splitting of ${}^1S_0$ is smaller by about three orders of magnitude than that of ${}^3P_1$. Therefore, assuming that the energy of the magnetic sublevel $m_F$ of ${}^1S_0$ (F=9/2) is the same, the level $m_F$ is used as the x-axis. On the other hand, in the Zeeman splitting of ${}^3P_1$ (F'=11/2), the energy of =−11/2 is lowest, and the energy of $m_{F'}$=11/2 is highest. The numbers on the right side of Zeeman splitting lines (reference numeral 200 in FIG. 10) each indicate the magnetic quantum number $m_{F'}$ of ${}^3P_1$.

The principle of the narrow-line MOT will be explained below under the abovementioned conditions. The F'=11/2 laser of a $\sigma^-$ polarized beam detuned to the negative side from the resonance frequency of ${}^1S_0$ (F=9/2) and ${}^3P_1$ (F'=11/2) enters from both the positive and negative sides of the x-axis. In FIG. 10, reference numeral 201 represents the frequency of the F'=11/2 laser. Referring to FIG. 10, the quantization axis is in the direction of the magnetic field. The $\sigma^-$ polarized beam is a polarized beam by which a magnetic quantum number change $\Delta m_F = m_{F'} - m_F$ changes by −1. Similarly, a $\sigma^+$ polarized beam is a polarized beam by which the magnetic quantum number change $\Delta m_F = m_{F'} - m_F$ changes by +1. The $\sigma^-$ polarized beam entering from the −x side (the left side in FIG. 10) becomes the $\sigma^+$ polarized beam because the direction of the magnetic field (quantization axis) is reversed in a region where x>0.

Assume that an atom 202 of $m_F=-9/2$ is in a position where x>0 and moves in the +x direction (to the right side in FIG. 10). The atom 202 of $m_F=-9/2$ absorbs the $\sigma^-$ polarized beam in a position that resonates with $m_F=-9/2 \rightarrow m_{F'}=-11/2$, and transits to $m_{F'}=-11/2$. The atom 202 having transited to $m_{F'}=11/2$ causes spontaneous emission in accordance with the branching fraction of spontaneous emission shown in FIG. 11, and transits to $m_F=-9/2$. Since spontaneous emission of light is isotropic, a net force which an atom receives is presumably zero. Thereby, the atom 202 of $m_F=-9/2$ receives a force in the −x direction. If only the $\sigma^-$ transition of $m_F=-9/2$ occurs as described above, the cooling cycle is closed, no heating occurs, and it is possible to strongly trap an atom. In practice, however, as the value of x increases, resonance lines of $\sigma^\pm$ transitions of atoms having $m_F=-7/2$, $-5/2$, $-3/2$, and $-1/2$, including $\sigma^+$ transitions from $m_F=-9/2$ to $m_{F'}=-7/2$, exist near. Accordingly, an atom having absorbed the $\sigma^-$ polarized beam is trapped by receiving the force in the −x direction, and an atom having absorbed the $\sigma^+$ polarized laser receives the force in the +x direction.

Note also that an atom excited to $m_{F'}<0$ easily causes spontaneous emission $m_{F'} \leq m_F$ due to the branching fraction of spontaneous emission. Consequently, as the number of times of the absorption of the F'=11/2 laser increases, the number of heated atoms increases while $m_F$ gradually approaches the positive side. In addition, since the magnetic field inverts at the position where x=0 in the trap, an atom whose sign of spin has inverted to $m_F>0$ probably exists among atoms having crossed x=0. An atom having changed to the state of $m_F>0$ in these processes hardly absorbs the F'=11/2 laser and deviates from the trap. Likewise, of atoms existing in x<0, an atom of $m_F=-9/2$ with $\sigma^-$ transition is trapped by receiving a force in the +x direction, but cooling and heating simultaneously occur for other atoms, so an atom of $m_F>0$ deviates from the trap. Thus, when there is only the trapping beam, atoms are gradually heated, and the number of trapped atoms decreases.

The repumping beam will now be explained. As explained above, the magnetic quantum number $m_F$ of an atom approaches the positive side due to the F'=11/2 laser. Therefore, the repumping beam that returns the state $m_F$ of an atom to the negative side is used. In practice, as shown in FIG. 9, the F'=9/2 laser between $^1S_0$ (F=9/2) and $^3P_1$ (F'=9/2) is used as the repumping beam 103. Since the Zeeman splitting of this transition is smaller than that of the transition between $^1S_0$ (F=9/2) and $^3P_1$ (F'=11/2), the position dependence of the magnetic field is small, and this randomizes $m_F$. As a consequence, the number of atoms in the state of $m_F=-11/2$ increases, so the loss of the number of atoms can be reduced. Atoms in the state of $m_F<0$ can stably be trapped by thus using the F'=11/2 laser and the F'=9/2 laser at the same time.

The above explanation has been made based on a one-dimensional system, but the same explanation is applicable even when extending the system to a three-dimensional system.

There are some problems related to the frequency stability of the optical lattice clock. The stability of the optical lattice clock can be improved by shortening the deadtime between clock laser pulses, and increasing the number of atoms trapped in the optical lattice. The deadtime is about 1 sec, and one example of the main restricting factors is that the total time necessary for the first-stage MOT and the narrow-line MOT is about 500 ms. Also, since the number of atoms trapped in the optical lattice depends on the density of the narrow-line MOT, the trapping force of the narrow-line MOT must be increased. An example of a method of further improving the stability is a continuous operation of the optical lattice clock as a final method. To this end, the research of a continuous operation of the narrow-line MOT has also been made (literature 6: Shayne Bennetts, Chun-Chia Chen, Benjamin Pasquio, and Florian Schreck, "Steady-State Magneto-Optical Trap with 100-Fold Improved Phase-Space Density", PHYSICAL REVIEW LETTERS, 119, 223202, 2017). It is very important to improve the trapping force of the narrow-line MOT for this purpose as well.

The related narrow-line MOT will be explained below. An atom is trapped when $m_F<0$ as described above. Since no atom is trapped when $m_F>0$, this is probably a loss in terms of the number of atoms. Also, in relation to the repumping beam, the magnitude of Zeeman splitting of $^1S_0$ (F=9/2) and $^3P_1$ (F'=9/2) is 2/9 compared to the transition between $^1S_0$ (F=9/2) and $^3P_1$ (F'=11/2). Accordingly, the trapping force of the repumping beam is weak, and the range within which the repumping beam effectively functions becomes wider than that of the F'=11/2 laser. This may also be a cause that decreases the atomic density.

SUMMARY OF THE INVENTION

The present invention has been made to solve the above problems, and has as its object to provide a magneto-optical trap method and a magneto-optical trap apparatus capable of improving the trapping force and the atomic density of a narrow-line magneto-optical trap, thereby shortening the time required for cooling/trapping of atoms.

A magneto-optical trap method as one aspect of the present invention includes a step of applying a magnetic field to an atom having a nuclear spin of 3/2 or more and encapsulated in a vacuum vessel by using an anti-Helmholtz coil, a step of generating a laser beam including a first laser beam detuned from a first resonance frequency when the atom transits from a total angular momentum quantum number F in a ground state related to a hyperfine structure to a total angular momentum quantum number F'=F+1 in an excited state related to the hyperfine structure, and a second laser beam detuned from a second resonance frequency when the atom transits from the total angular momentum quantum number F in the ground state related to the hyperfine structure to a total angular momentum quantum number F'=F−1 in the excited state related to the hyperfine structure, among transitions of the atom from a total angular momentum quantum number J=0 in a ground state related to a fine structure to a total angular momentum quantum number J'=1 in an excited state related to the fine structure, and a step of irradiating the laser beam including the first laser beam and the second laser beam toward the atom in the vacuum vessel from a plurality of directions including at least a pair of opposite directions.

A magneto-optical trap apparatus as another aspect of the present invention includes a vacuum vessel (409) for encapsulating an atom (205) to be trapped, an anti-Helmholtz coil (410) configured to apply a magnetic field to an inside of the vacuum vessel (409), a laser device (400) configured to generate a laser beam including a first laser beam detuned from a first resonance frequency when the atom (205) transits from a total angular momentum quantum number F in a ground state related to a hyperfine structure to a total angular momentum quantum number F'=F+1 in an excited state related to the hyperfine structure, and a second laser beam detuned from a second resonance frequency when the atom (205) transits from the total angular momentum quantum number F in the ground state related to the hyperfine structure to a total angular momentum quantum number F'=F−1 in the excited state related to the hyperfine structure, among transitions of the atom (205) from a total angular momentum quantum number J=0 in a ground state related to a fine structure to a total angular momentum quantum number J'=1 in an excited state related to the fine structure, and an irradiation device (411) configured to irradiate the laser beam generated by the laser device (400) toward one point inside the vacuum vessel (409) from a plurality of directions including at least a pair of opposite directions.

DESCRIPTION OF THE PREFERRED EMBODIMENTS

Embodiments of the present invention will be explained below. In the following embodiments, a narrow-line dual-operation magneto-optical trap (to be referred to as MOT hereinafter) will be proposed for the purposes of shortening the deadtime and increasing the atomic density. A related narrow-line MOT that traps only an atom of $m_F<0$ is caused to apply the trapping force on an atom in the state of $m_F>0$ as well. This makes it possible to efficiently apply the trapping force on all magnetic quantum numbers $m_F$. Consequently, the atomic density increases, and the efficiency of transition of the number of atoms from the narrow-line MOT to an optical lattice potential expectably improves.

Figure 1:
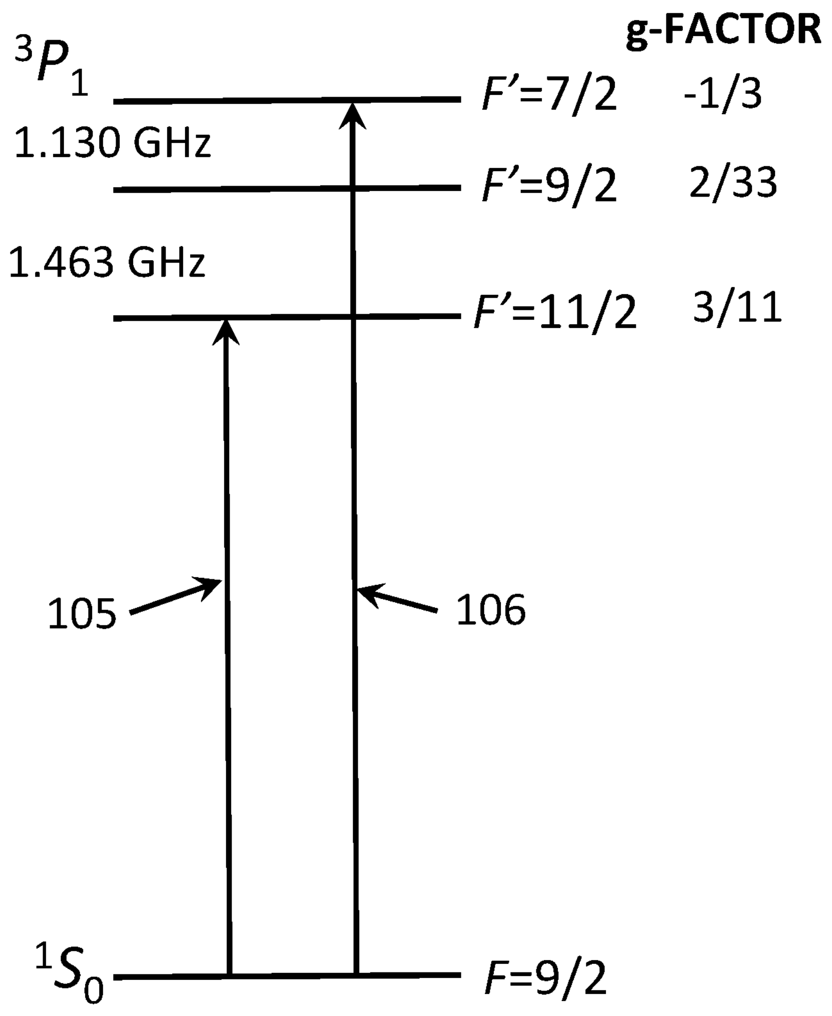
FIG. 1 is a narrow-line dual-operation magneto-optical trap transition diagram according to an embodiment of the present invention.

A narrow-line dual-operation MOT will be explained below. As shown in FIG. 1, this narrow-line dual-operation MOT uses a trapping beam 105 (to be referred to as an F'=11/2 laser hereinafter) having a frequency detuned to the negative side with respect to the resonance frequency when an atom transits from $^1S_0$ (F=9/2) to $^3P_1$ (F'=11/2). In addition, a trapping beam 106 (to be referred to as an F'=7/2 laser hereinafter) having a frequency detuned to the negative side with respect to the resonance frequency when an atom transits from $^1S_0$ (F=9/2) to $^3P_1$ (F'=7/2) is used instead of the F'=9/2 laser used as the repumping beam in the related MOT.

Figure 2:
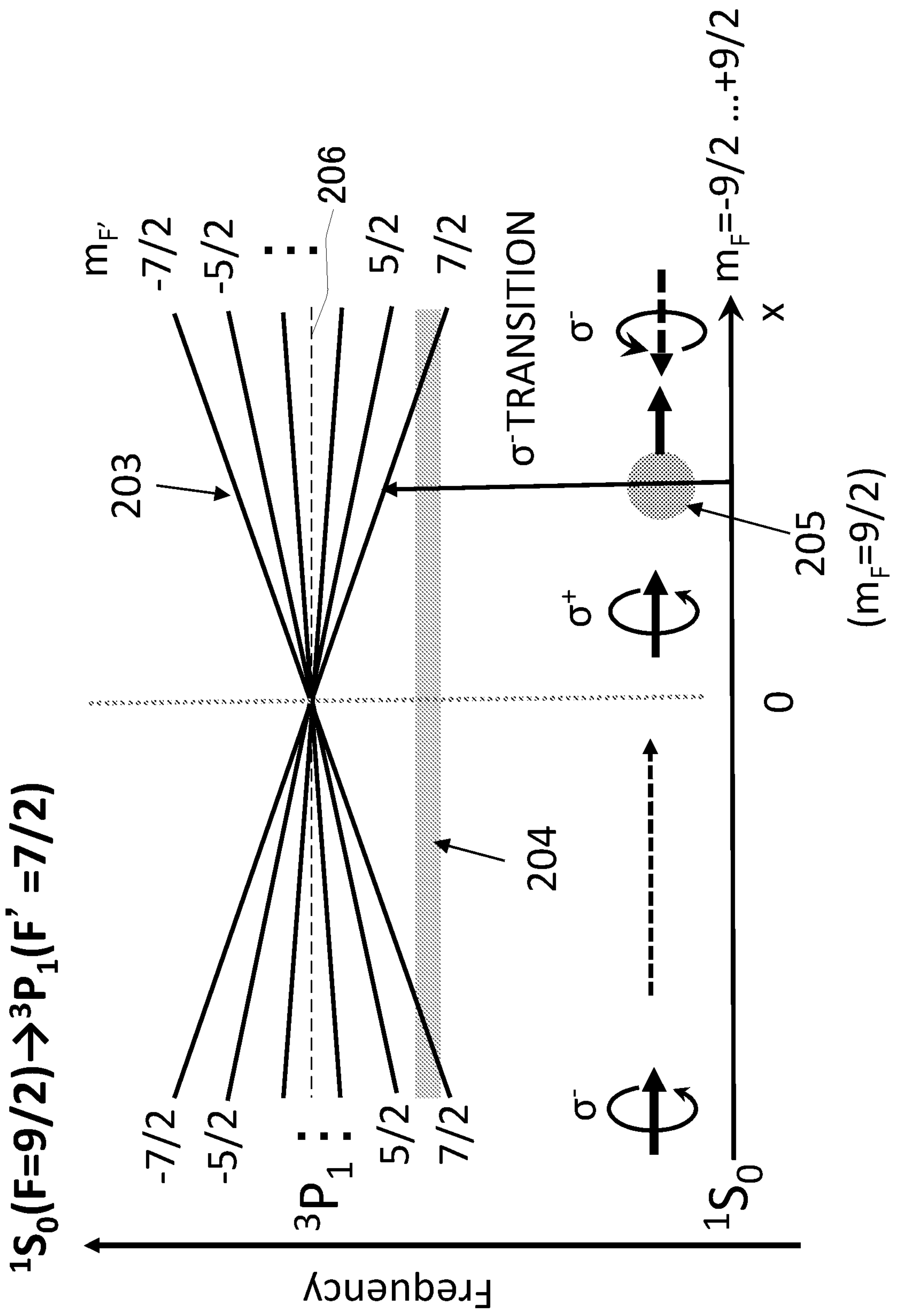
FIG. 2 is a view for explaining the principle of the narrow-line dual-operation magneto-optical trap according to the embodiment of the present invention.
Figure 11:
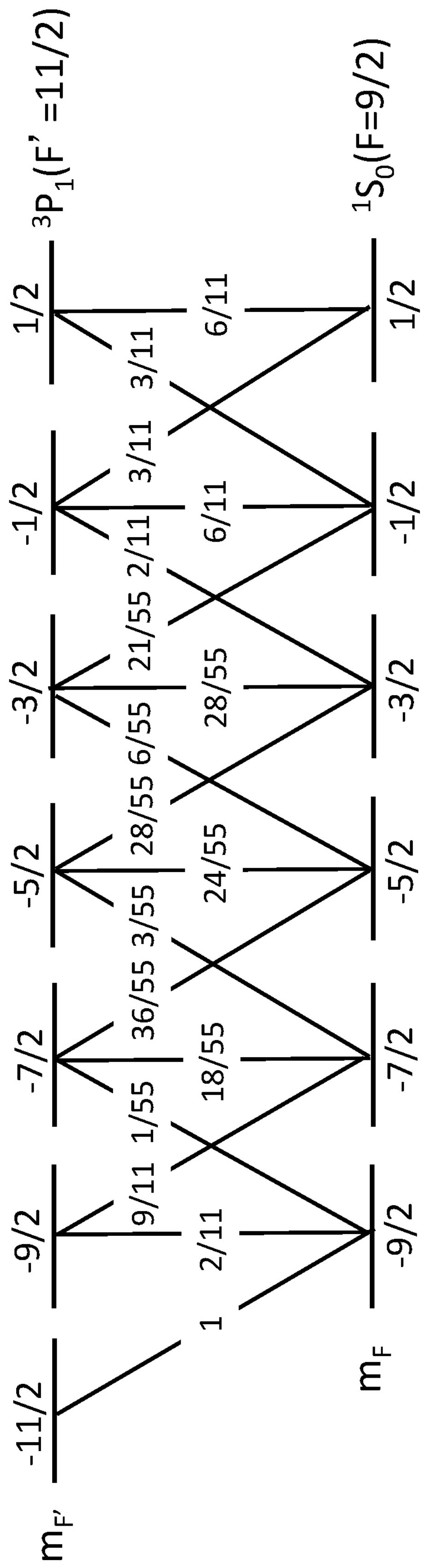
FIG. 11 is a view showing the branching fraction of spontaneous emission of an atom having transited from $^1S_0$ (F=9/2) to $^3P_1$ (F'=11/2).

The operation of the F'=7/2 laser will be explained with reference to FIG. 2. Referring to FIG. 2, reference numeral 203 denotes a Zeeman splitting line; and 204, the frequency of the F'=7/2 laser. The magnitude of the g-factor of $^3P_1$ (F'=7/2) is almost the same as that of $^3P_1$ (F'=11/2) and has a minus sign. Therefore, the magnitude of Zeeman splitting of the F'=7/2 laser is opposite to that of the F'=11/2 laser. The magnitude of Zeeman splitting is the distance from an energy level 206 when there is no magnetic field and degeneracy has occurred. Comparison of FIGS. 2 and 11 reveals that the order of magnetic quantum numbers $m_{F'}$ is reversed. Only an energy level below the degenerated energy level 206 can be used to trap an atom. Accordingly, the trapping force can be applied to an atom of $m_F>0$ by using the F'=7/2 laser.

Figure 3:
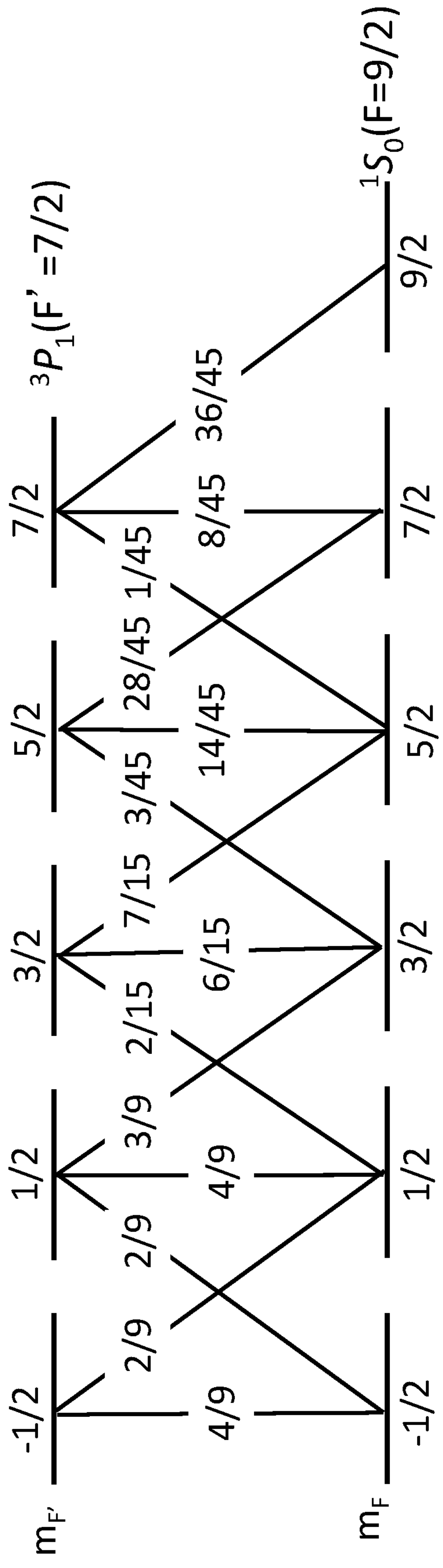
FIG. 3 is a view showing the branching fraction of spontaneous emission of an atom having transited from 1S0 (F=9/2) to 3P1 (F'=7/2)

A case in which a $\sigma^-$ polarized beam detuned to the negative side from the transition frequency of $^1S_0$ (F=9/2)→$^3P_1$ (F'=7/2) enters from both the positive and negative sides of the x-axis will be explained below. When an atom 205 in the state of $m_F$=9/2 exists in x>0, the atom 205 transits to $m_{F'}$=7/2 by absorbing $\sigma^-$ beams from opposite directions. In this case, as shown in FIG. 3, many atoms are spontaneously emitted in the state of $m_F$=9/2. Since spontaneous emission isotropically occurs, an atom receives a net force on the −x side. It is known that this process does not completely close the cooling cycle but functions as a trapping force. As in the above explanation, as the value of x increases, $m_F$ gradually approaches the negative side because $\sigma^\pm$ transitions of other atoms in the $m_F>0$ state exist near. An atom having changed to $m_F<0$ hardly absorbs the F'=7/2 laser.

Next, a case in which both the F'=7/2 laser and the F'=11/2 laser are operated will be explained. While the F'=7/2 laser is operated, atoms having changed to $m_F<0$ are beginning to be trapped this time by the F'=11/2 laser. This similarly occurs when an atom exists in x<0. As a consequence, an atom of $m_F<0$ existing within the trap range of the x-axis is trapped by the F'=11/2 laser, and an atom of $m_F>0$ is trapped by the F'=7/2 laser. Thus, the narrow-line MOT effectively acts on all magnetic quantum numbers $m_F$. This action of the narrow-line MOT is the same even when the system is extended to a three-dimensional system.

A general conditional formula when the narrow-linewidth dual-operation MOT acts in a transition from J=0 to J'=1 such as that of strontium atoms described above will be explained below based on the quantum number and the g-factor.

First, the relationship between a nuclear spin I and total angular momentum quantum numbers F and F' will be explained. To perform the narrow-linewidth dual-operation MOT, two levels F'=F+1 and F'=F−1 are necessary. The values of F and F' can be obtained by synthesizing the nuclear spin I (an integral multiple of 1/2) and the angular momentums of J and J'. When I=1/2, F=1/2 and F'=3/2 and 1/2. Since, however, F'=F−1 does not exist, I=1/2 does not hold. When I=1, F=1 and F'=2, 1, and 0, so F'=F−1 exists. However, no Zeeman splitting occurs when F'=0, so no MOT can be performed on F'=F−1. When I≥3/2, F=1 and F'=I+1, I, and I−1. In this case, the MOT acts on both F'=F+1 and F'=F−1.

The sign of the g-factor will be explained below. To perform the narrow-line dual-operation MOT, the g-factor must be positive when F'=I+1 and negative when F'=I−1. The sign of the g-factor is decided by the following expressions.

$$g\text{-factor is positive} \Leftrightarrow F'(F'+1)-I(I+1)+2>0$$

$$g\text{-factor is negative} \Leftrightarrow F'(F'+1)-I(I+1)+2<0$$

Now, it is only necessary to consider a case in which I≥3/2. In this case, the relationship between the signs of the g-factor when F'=I+1 and F'=I−1 always holds. From the foregoing, the final condition for performing the narrow-line dual-operation MOT is that the nuclear spin I is I≥3/2. When taking the energy structure into consideration, transitions that excite the same $m_{F'}$ exist due to a $\sigma^+$ polarized beam and a $\sigma^-$ polarized beam under the abovementioned condition, so the narrow-line dual-operation MOT of this embodiment functions. As explained previously, $^{87}$Sr satisfies the condition because I=9/2. Another example of an atom is 173 ytterbium ($^{173}$Yb, I=5/2). In this case, it is presumably possible to effectively operate the narrow-line dual-operation MOT by using $^1S_0$ (F=5/2)→$^3P_1$ (F'=7/2) and $^1S_0$ (F=5/2)→$^3P_1$ (F'=3/2).

Figure 4:
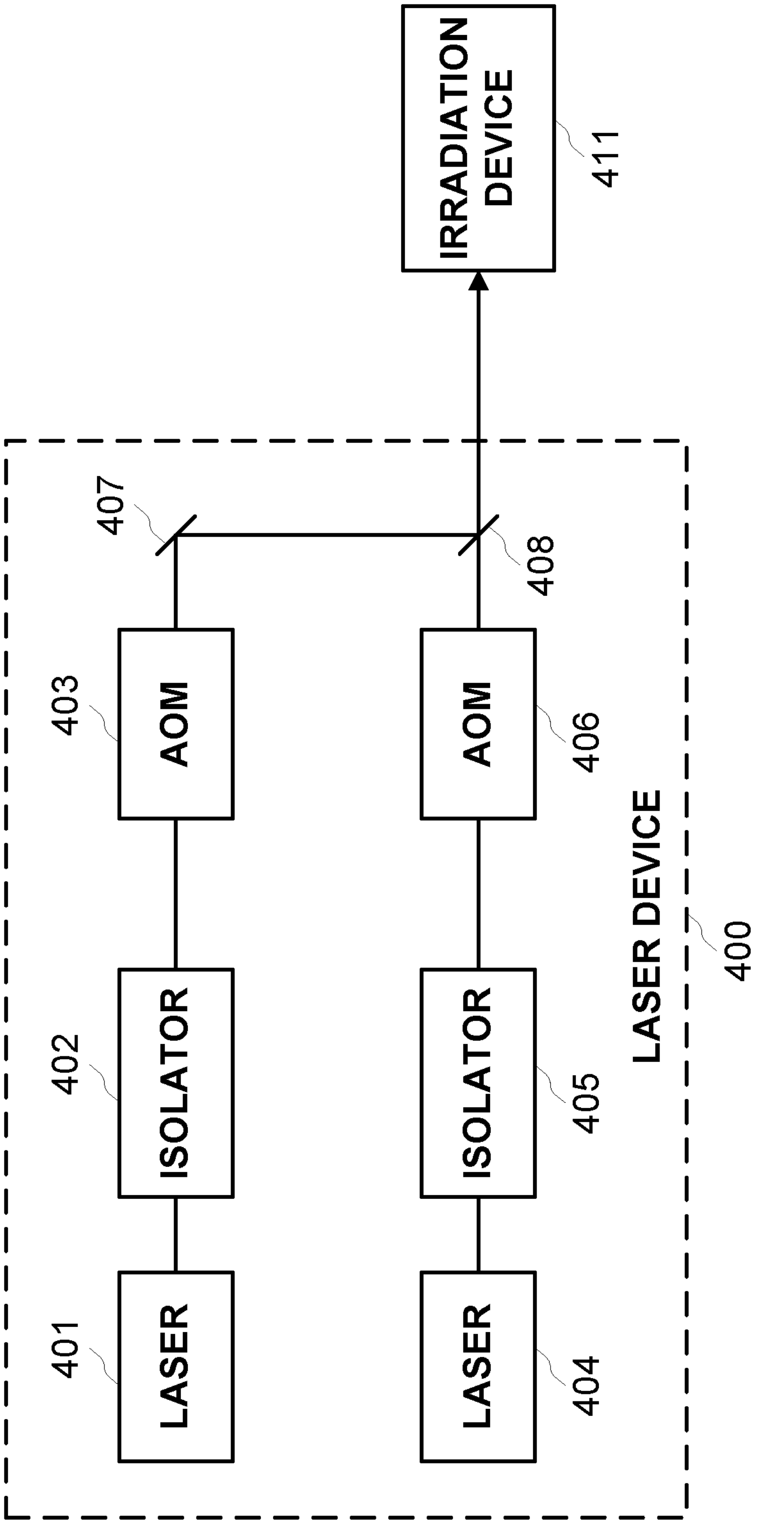
FIG. 4 is a block diagram showing a laser device of a magneto-optical trap apparatus as the embodiment of the present invention.

A laser device used in the MOT apparatus of this embodiment will be explained below. As shown in FIG. 4, a laser device 400 includes lasers 401 and 404, isolators 402 and 405, AOMs (Acousto-Optic Modulators) 403 and 406, a mirror 407, and a beam splitter 408.

The laser 401 is used as the F'=11/2 laser, and the laser 404 is used as the F'=7/2 laser. The frequencies of the lasers 401 and 404 are stabilized by using a highly stable reference laser.

To prevent optical feedback, an F'=11/2 laser beam from the laser 401 is passed through the isolator 402. An exit beam from the isolator 402 is passed through the AOM 403 for performing frequency modulation. Likewise, an F'=7/2 laser beam from the laser 404 is passed through the isolator 405, and an exit beam from the isolator 405 is passed through the AOM 406. The frequencies of the laser beams can be detuned to the negative side by passing the exit beams from the isolators 402 and 405 through the AOMs 403 and 406.

The F'=11/2 laser beam from the AOM 403 is reflected by the mirror 407, and multiplexed with the F'=7/2 laser beam from the AOM 406 by the beam splitter 408.

Note that the polarized states of the two lasers 401 and 404 are the same, so two frequencies can also be generated by using a carrier wave and a sideband wave by applying a difference frequency of 2.593 GHz between the F'=7/2 laser and the F'=11/2 laser to an EOM (Electro-Optic Modulator). Consequently, a single laser can achieve the functions of the two lasers 401 and 404.

Figure 5:
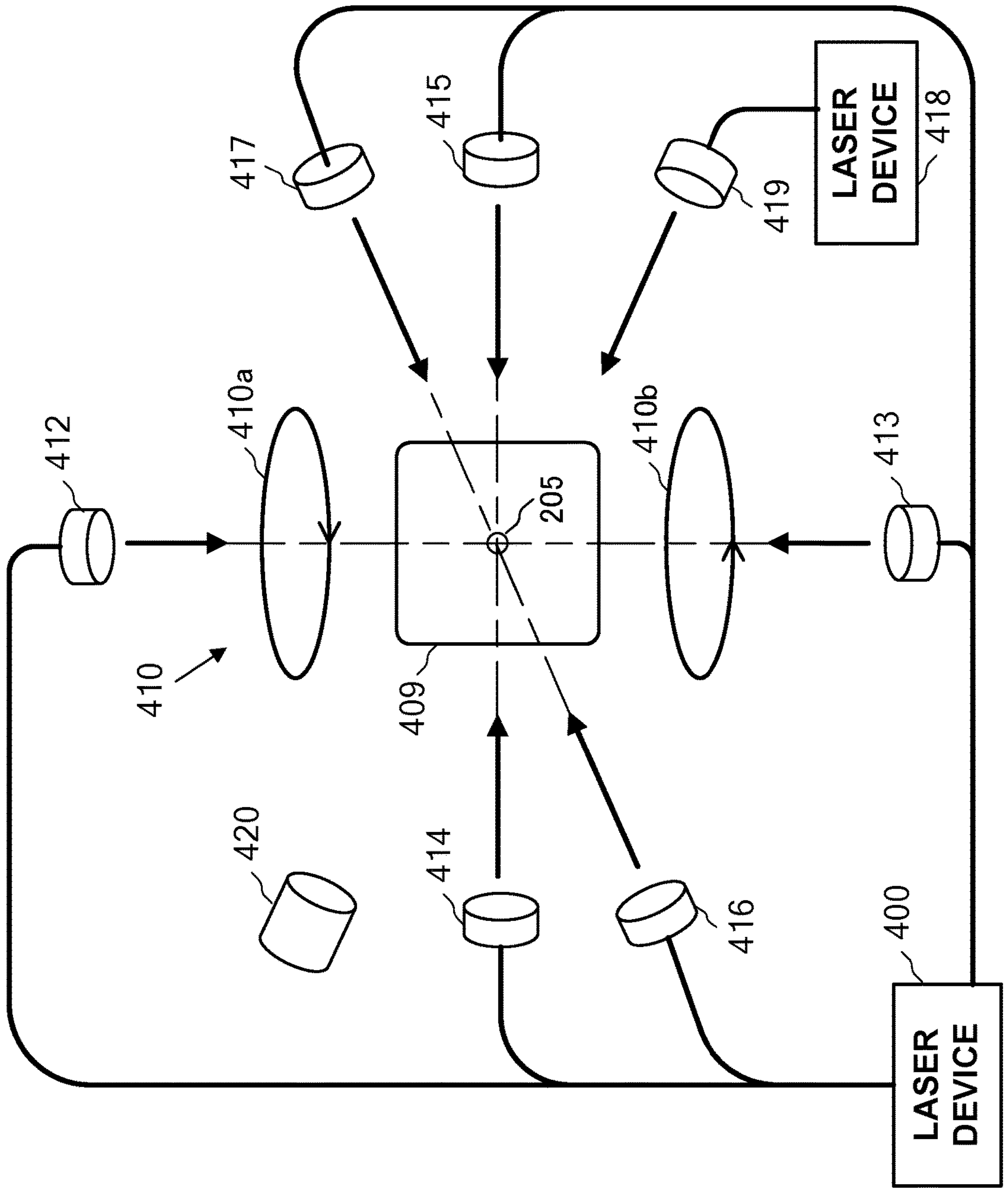
FIG. 5 is a view showing the arrangement of the main body of the magneto-optical trap apparatus as the embodiment of the present invention.

The arrangement of the MOT apparatus of this embodiment will be explained below. As shown in FIG. 5, the MOT apparatus includes the laser device 400, a vacuum vessel (vacuum cell) 409 for encapsulating the atoms 205 to be trapped, an anti-Helmholtz coil 410 for applying a magnetic field to the inside of the vacuum vessel 409, an irradiation device 411 (see FIG. 4) for irradiating laser beams generated by the laser device 400 from a plurality of directions toward the origin inside the vacuum vessel 409, a laser device 418 for generating a probe beam for measurement, a probe beam irradiation device 419 for irradiating the probe beam toward the origin inside the vacuum vessel 409, and a detection device 420 such as a CCD camera. The plurality of directions along which the irradiation device 411 irradiates laser beams include at least a pair of opposite directions.

In this embodiment, an 87 strontium (87Sr) atomic gas is encapsulated in the vacuum vessel 409.

The anti-Helmholtz coil 410 includes a pair of coils 410*a* and 410*b*. The coils 410*a* and 410*b* have the same arrangement, and are so placed as to sandwich the vacuum vessel 409. The coils 410*a* and 410*b* form a quadrupole magnetic field by flowing electric currents in opposite directions, and apply this quadrupole magnetic field to the atomic gas in the vacuum vessel 409. In this state, the zero point of the quadrupole magnetic field is so set as to match the origin (the center of the trap, that is, the point of x=0 in the example shown in FIG. 2) in the vacuum vessel 409.

Figure 6:
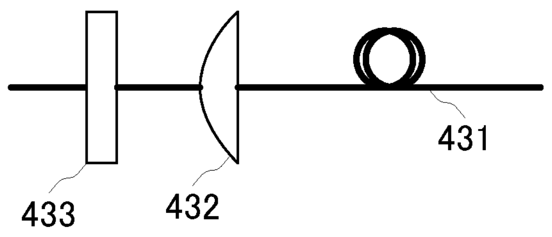
FIG. 6 is a view showing the arrangement of a trapping beam irradiation device shown in FIG. 5.

The irradiation device 411 includes a plurality of trapping beam irradiation devices. In this embodiment, the irradiation device 411 includes six trapping beam irradiation devices 412 to 417. The trapping beam irradiation devices 412 to 417 are arranged on three axes passing the origin in the vacuum vessel 409. As shown in FIG. 6, each of the trapping beam irradiation devices 412 to 417 includes an optical fiber 431, a condenser lens 432 connected to the optical fiber 431, and a λ/4 wave plate 433 arranged behind the condenser lens 432. The trapping beam irradiation devices 412 to 417 convert the laser beams generated by the laser device 400 into $\sigma^-$ polarized beams (trapping beams) by the λ/4 wave plates 433, and irradiate the $\sigma^-$ polarized beams to the origin in the vacuum vessel 409 in the positive and negative directions of the three axes, i.e., in a total of six directions, thereby irradiating the atomic gas in the vacuum vessel 409 with three pairs of counterpropagating $\sigma^-$ polarized beams. In this state, as shown in FIG. 2, counterpropagating $\sigma^-$ polarized beams are circularly polarized beams rotating in opposite directions.

One of the two trapping beam irradiation devices arranged on the same axis, e.g., each of the trapping beam irradiation devices 413, 415, and 417 may also be formed by using a mirror and a λ/4 wave plate. In this case, $\sigma^-$ polarized beams from the trapping beam irradiation devices 412, 414, and 416 propagate toward the origin from the positive directions of the three axes. The $\sigma^-$ polarized beams having passed through the origin are reflected by the mirrors of the trapping beam irradiation devices 413, 415, and 417, and propagate toward the origin from the negative directions of the three axes. The atomic gas in the vacuum vessel 409 can be irradiated with the three pairs of counterpropagating $\sigma^-$ polarized beams in this manner as well.

Note that the $\sigma^-$ polarized beams are irradiated from six directions in this embodiment. However, the atomic gas in the vacuum vessel 409 need only be irradiated with at least one pair of counterpropagating $\sigma^-$ polarized beams by irradiating the $\sigma^-$ polarized beams from at least two directions.

The laser device 418 generates the probe beam for measurement. The probe beam irradiation device 419 irradiates the probe beam from the laser device 418 toward the atomic gas in the vacuum vessel 409. The detection device 420 detects the emission of light of the atomic gas in the vacuum vessel 409. Note that the devices 418 to 420 are not essential elements of the MOT apparatus.

Figure 7A:
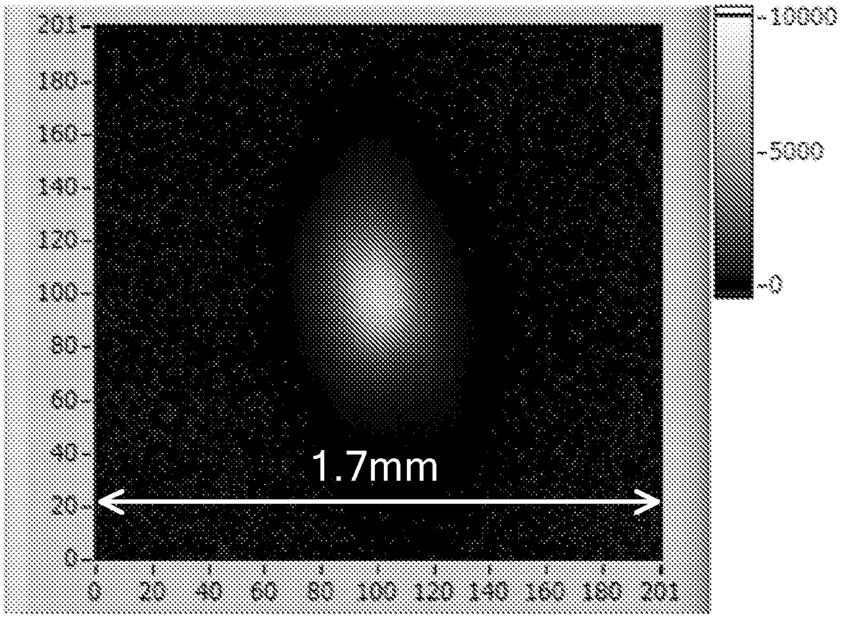
FIG. 7A shows a fluorescence image of atoms obtained by a related magneto-optical trap apparatus.
Figure 7B:
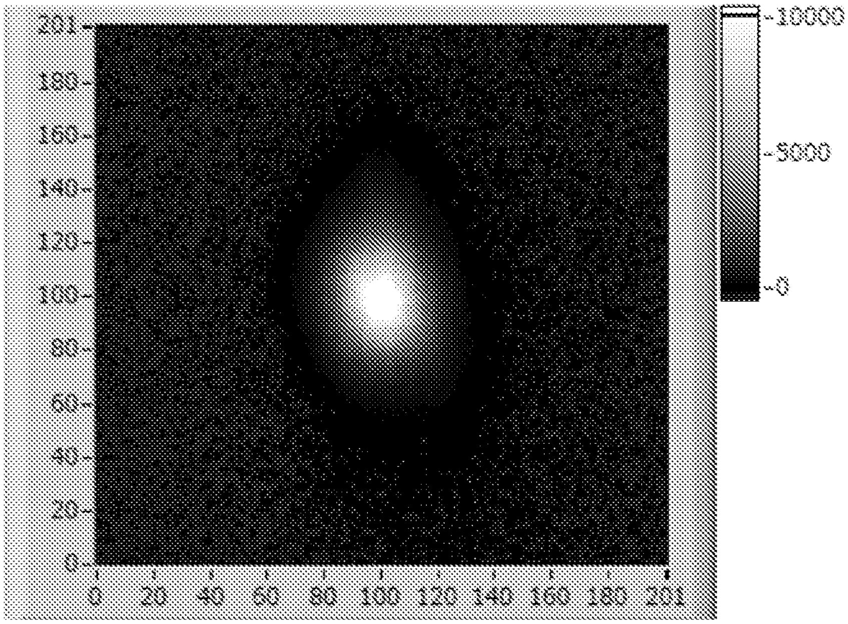
FIG. 7B shows a fluorescence image of atoms obtained by the magneto-optical trap apparatus as the embodiment of the present invention.

FIGS. 7A and 7B show fluorescence images of the second-stage MOT of the 87 strontium atoms obtained by the MOT apparatus as described above. FIGS. 7A and 7B show images of the second-stage MOT obtained, after the first-stage MOT, when the density was maximized by adjusting the laser frequency and the time sequence with the same magnetic field gradient and the same laser intensity. The fluorescence image shown in FIG. 7A was obtained after the 87 strontium atoms were cooled/trapped for 250 ms by using the F'=11/2 laser and the F'=9/2 laser of the related MOT. The fluorescence image shown in FIG. 7B was obtained after the 87 strontium atoms were cooled/trapped for 180 ms by using the F'=11/2 laser and the F'=7/2 laser of this embodiment.

Figure 8A:
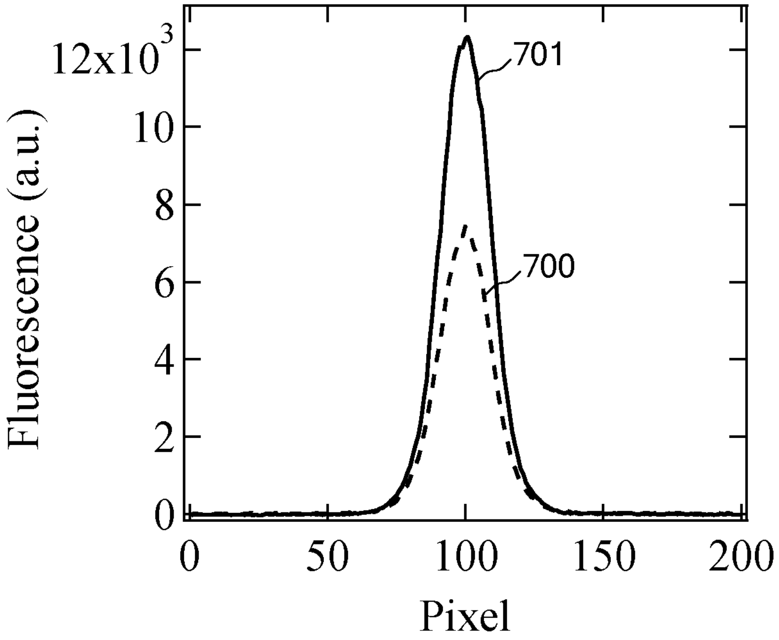
FIG. 8A is a view showing the fluorescence amount of atoms obtained by the related magneto-optical trap apparatus.
Figure 8B:
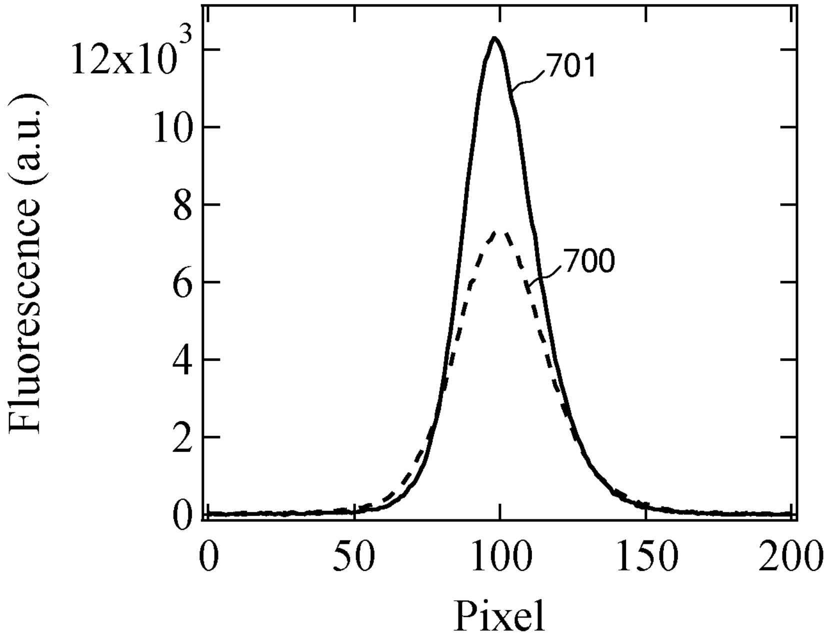
FIG. 8B is a view showing the fluorescence amount of atoms obtained by the magneto-optical trap apparatus as the embodiment of the present invention.
Figure 9:
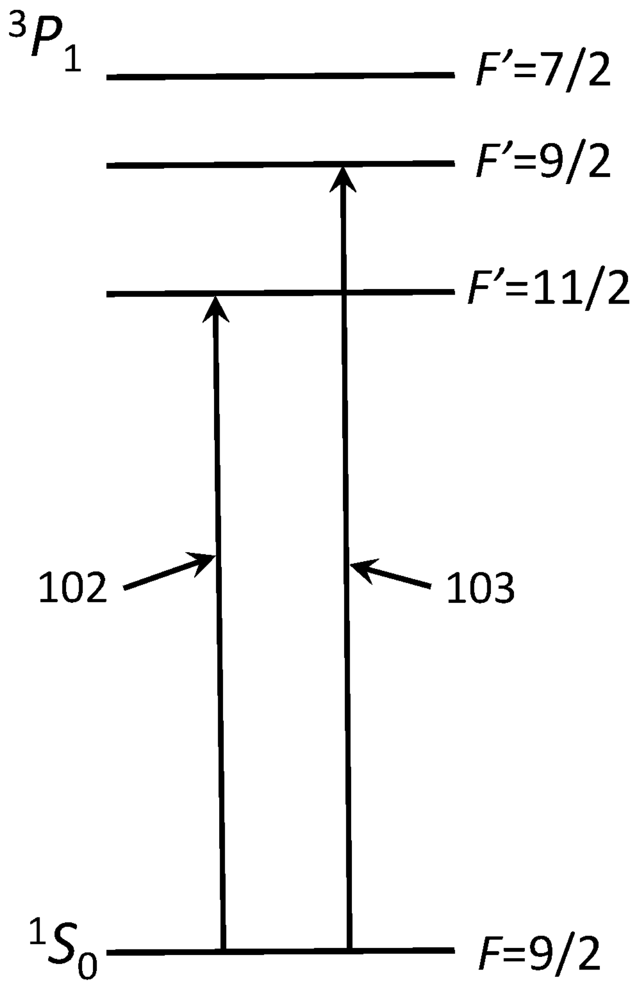
FIG. 9 is a transition diagram of a related narrow-line magneto-optical trap.
Figure 10:
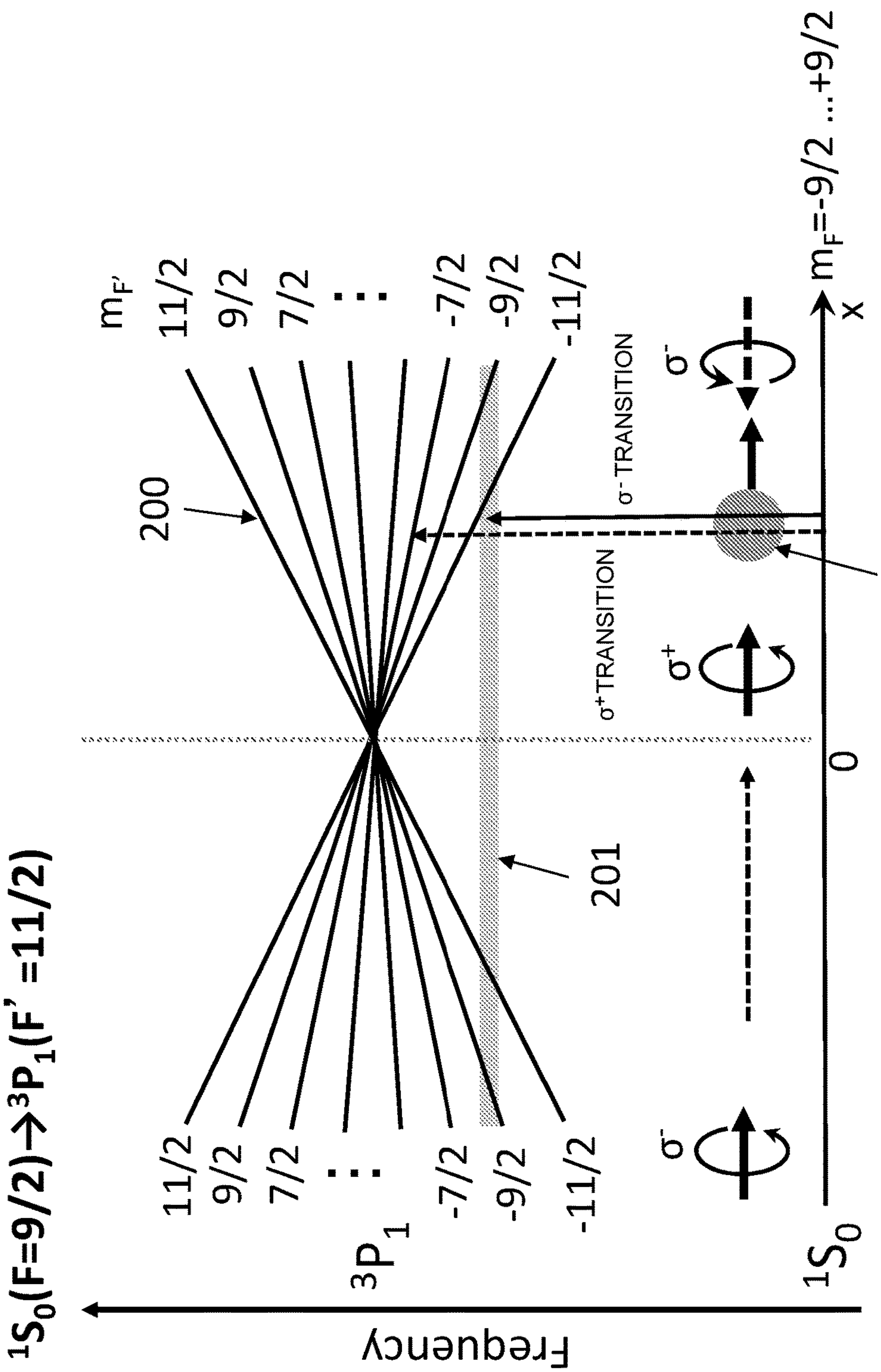
FIG. 10 is a view for explaining the principle of the related narrow-line magneto-optical trap.

FIG. 8A is a view showing fluorescence amounts when the fluorescence images shown in FIGS. 7A and 7B were cut out along a horizontal line passing through the centers of the images. FIG. 8B is a view showing fluorescence amounts when the fluorescence images shown in FIGS. 7A and 7B were cut out along a vertical line passing through the centers of the images. In FIGS. 8A and 8B, reference numeral 700 denotes the fluorescence amount of the atoms obtained when the F'=11/2 laser and the F'=9/2 laser of the related MOT were used; and 701, the fluorescence amount of the atoms obtained by this embodiment.

FIGS. 7A, 7B, 8A, and 8B demonstrate that the MOT apparatus of this embodiment increased the peak fluorescence amount and decreased the full width at half maximum of an atomic cloud. The estimation of the number of atoms reveals that the number of atoms and the atomic density of this embodiment improved by 1.3 times and 2 times, respectively, from those of the related method.

Although not shown, when this embodiment and the related method were compared after the 87 strontium atoms were cooled/trapped for 180 ms, the numbers of atoms were almost equal, but the atomic density of this embodiment was about 4.5 times that of the related method. This shows that in this embodiment, it was possible to shorten the time required for cooling/trapping of atoms by 70 ms compared to the related art, and the narrow-line MOT efficiently acted.

In this embodiment, the trapping force and the atomic density of the narrow-line MOT improved, and it was also possible to shorten the time necessary for cooling/trapping. This makes this embodiment applicable to the continuous operation of the narrow-line MOT (non-patent literature 6). Furthermore, it is presumably possible to apply this embodiment to researches requiring high-density atoms in quantum degeneracy such as Bose-Einstein condensation and Fermi degeneracy.

In this embodiment, the laser beam (the $\sigma^-$ polarized beam detuned to the negative side by a predetermined frequency (e.g., a few tens of kHz) from the first resonance frequency) having a frequency matching the first resonance frequency when the 87 strontium atom transits from the ground state F=9/2 to the excited state F'=11/2 is the first laser beam, and the laser beam (the $\sigma^-$ polarized beam detuned to the negative side by a predetermined frequency from the second resonance frequency) having a frequency matching the second resonance frequency when the 87 strontium atom transits from the ground state F=9/2 to the excited state F'=7/2 is the second laser beam. However, the present invention is also applicable to the 173 ytterbium atom as described earlier.

When the 173 ytterbium atom is a target, the laser beam (the $\sigma^-$ polarized beam detuned to the negative side by a predetermined frequency from the first resonance frequency) having a frequency matching the first resonance frequency when the 173 ytterbium atom transits from the ground state F=5/2 to the excited state F'=7/2 can be used as the first laser beam, and the laser beam (the $\sigma^-$ polarized beam detuned to the negative side by a predetermined frequency from the second resonance frequency) having a frequency matching the second resonance frequency when the 173 ytterbium atom transits from the ground state F=5/2 to the excited state F'=3/2 can be used as the second laser beam.

As explained above, the magneto-optical trap method as one aspect of the present invention includes a step of applying a magnetic field to an atom (205) encapsulated in a vacuum vessel (409) and having a nuclear spin of 3/2 or more by using an anti-Helmholtz coil (410), a step of generating a laser beam including a first laser beam detuned from a first resonance frequency when the atom (205) transits from a total angular momentum quantum number F in a ground state related to a hyperfine structure to a total angular momentum quantum number F'=F+1 in an excited state related to the hyperfine structure, and a second laser beam detuned from a second resonance frequency when the atom (205) transits from the total angular momentum quantum number F in the ground state related to the hyperfine structure to a total angular momentum quantum number F'=F−1 in the excited state related to the hyperfine structure, among transitions of the atom (205) from a total angular momentum quantum number J=0 in a ground state related to a fine structure to a total angular momentum quantum number J'=1 in an excited state related to the fine structure, and a step of irradiating the laser beam including the first laser beam and the second laser beam toward the atom (205) in the vacuum vessel (409) from a plurality of directions including at least a pair of opposite directions. The laser beam generation step sometimes includes not only a case in which the first and second laser beams are generated by detuning to the negative side from the first and second resonance frequencies, but also a case in which the first and second laser beams are generated by detuning to the positive side from the first and second resonance frequencies.

The irradiation step may also include a step of converting the laser beam including the first laser beam and the second laser beam into one of a $\sigma^-$ polarized beam and a $\sigma^+$ polarized beam. When performing detuning to the negative side, the laser beam is converted into the $\sigma^-$ polarized beam. When performing detuning to the positive side, the laser beam is converted into the $\sigma^+$ polarized beam.

An 87 strontium atom can be used as the atom (205) to be trapped. In this case, it is possible to generate, as the first laser beam, a laser beam detuned from the first resonance frequency when the 87 strontium atom transits from a total angular momentum quantum number F=9/2 in the ground state related to the hyperfine structure to a total angular momentum quantum number F'=11/2 in the excited state related to the hyperfine structure. It is also possible to generate, as the second laser beam, a laser beam detuned from the second resonance frequency when the 87 strontium atom transits from the total angular momentum quantum number F=9/2 in the ground state related to the hyperfine structure to a total angular momentum quantum number F'=7/2 in the excited state related to the hyperfine structure.

Furthermore, a 173 ytterbium atom can be used as the atom (205) to be trapped. In this case, it is possible to generate, as the first laser beam, a laser beam detuned from the first resonance frequency when the 173 ytterbium atom transits from a total angular momentum quantum number F=5/2 in the ground state related to the hyperfine structure to the total angular momentum quantum number F'=7/2 in the excited state related to the hyperfine structure. It is also possible to generate, as the second laser beam, a laser beam detuned from the second resonance frequency when the 173 ytterbium atom transits from the total angular momentum quantum number F=5/2 in the ground state related to the hyperfine structure to a total angular momentum quantum number F'=3/2 in the excited state related to the hyperfine structure.

The magneto-optical trap apparatus as another aspect of the present invention includes a vacuum vessel (409) for encapsulating an atom (205) to be trapped, an anti-Helmholtz coil (410) configured to apply a magnetic field to an inside of the vacuum vessel (409), a laser device (400) configured to generate a laser beam including a first laser beam detuned from a first resonance frequency when the atom (205) transits from a total angular momentum quantum number F in a ground state related to a hyperfine structure to a total angular momentum quantum number F'=F+1 in an excited state related to the hyperfine structure, and a second laser beam detuned from a second resonance frequency when the atom (205) transits from the total angular momentum quantum number F in the ground state related to the hyperfine structure to a total angular momentum quantum number F'=F−1 in the excited state related to the hyperfine structure, among transitions of the atom (205) from a total angular momentum quantum number J=0 in a ground state related to a fine structure to a total angular momentum quantum number J'=1 in an excited state related to the fine structure, and an irradiation device (411) configured to irradiate the laser beam generated by the laser device (400) toward one point inside the vacuum vessel (409) from a plurality of directions including at least a pair of opposite directions. The laser device (400) generates not only the first and second laser beams detuned from the first and second resonance frequencies to the negative side, but also the first and second laser beams detuned from the first and second resonance frequencies to the positive side.

The atom (205) to be trapped can have a nuclear spin of 3/2 or more.

The irradiation device (411) can include a wave plate (433) configured to convert the laser beam into one of a $\sigma^-$ polarized beam and a $\sigma^+$ polarized beam. When performing detuning to the negative side, the wave plate (433) converts the laser beam into the $\sigma^-$ polarized beam. When performing detuning to the positive side, the wave plate (433) converts the laser beam into the $\sigma^+$ polarized beam.

An 87 strontium atom can be used as the atom (205) to be trapped. In this case, the laser device (400) can generate, as the first laser beam, a laser beam detuned from the first resonance frequency when the 87 strontium atom transits from a total angular momentum quantum number F=9/2 in the ground state related to the hyperfine structure to a total angular momentum quantum number F'=11/2 in the excited state related to the hyperfine structure. Also, the laser device (400) can generate, as the second laser beam, a laser beam detuned from the second resonance frequency when the 87 strontium atom transits from the total angular momentum quantum number F=9/2 in the ground state related to the hyperfine structure to a total angular momentum quantum number F'=7/2 in the excited state related to the hyperfine structure.

Furthermore, a 173 ytterbium atom can be used as the atom (205) to be trapped. In this case, the laser device (400) can generate, as the first laser beam, a laser beam detuned from the first resonance frequency when the 173 ytterbium atom transits from a total angular momentum quantum number F=5/2 in the ground state related to the hyperfine structure to a total angular momentum quantum number F'=7/2 in the excited state related to the hyperfine structure. Also, the laser device (400) can generate, as the second laser beam, a laser beam detuned from the second resonance frequency when the 173 ytterbium atom transits from the total angular momentum quantum number F=5/2 in the ground state related to the hyperfine structure to a total angular momentum quantum number F'=3/2 in the excited state related to the hyperfine structure.

According to the above-described aspects of the present invention, it is possible to improve the trapping force and the atomic density of a narrow-line magneto-optical trap, and shorten the time required for cooling/trapping of atoms.

This application claims the benefit of Japanese Patent Application No. 2019-032461, filed Feb. 26, 2019, which is hereby incorporated by reference herein in its entirety.

What is claimed is:

1. A magneto-optical trap method comprising steps of:

applying a magnetic field to an atom encapsulated in a vacuum vessel and having a nuclear spin of not less than 3/2 by using an anti-Helmholtz coil;

generating a laser beam including a first laser beam detuned from a first resonance frequency when the atom transits from a total angular momentum quantum number F in a ground state related to a hyperfine structure to a total angular momentum quantum number F'=F+1 in an excited state related to the hyperfine structure, and a second laser beam detuned from a second resonance frequency when the atom transits from the total angular momentum quantum number F in the ground state related to the hyperfine structure to a total angular momentum quantum number F'=F−1 in the excited state related to the hyperfine structure, among transitions of the atom from a total angular momentum quantum number J=0 in a ground state related to a fine structure to a total angular momentum quantum number J'=1 in an excited state related to the fine structure, by multiplexing the first laser beam and the second laser beam; and irradiating the laser beam including the first laser beam and the second laser beam toward the atom in the vacuum vessel from a plurality of directions including at least a pair of opposite directions, and simultaneously making the first laser beam trap the atom in a state that a magnetic quantum number is negative, and the second laser beam trap the atom in a state that the magnetic quantum number is positive, wherein the atom is a 173 ytterbium atom, and wherein the step of generating includes steps of:

generating, as the first laser beam, a laser beam detuned from the first resonance frequency when the 173 ytterbium atom transits from a total angular momentum quantum number F=5/2 in the ground state related to the hyperfine structure to a total angular momentum quantum number F'=7/2 in the excited state related to the hyperfine structure; and generating, as the second laser beam, a laser beam detuned from the second resonance frequency when the 173 ytterbium atom transits from the total angular momentum quantum number F=5/2 in the ground state related to the hyperfine structure to a total angular momentum quantum number F'=3/2 in the excited state related to the hyperfine structure.

2. The magneto-optical trap method according to claim 1, wherein the step of irradiating includes a step of converting the laser beam including the first laser beam and the second laser beam into one of a $\sigma^-$ polarized beam and a $\sigma^+$ polarized beam.

3. A magneto-optical trap apparatus comprising:

a vacuum vessel for encapsulating an atom to be trapped, the atom having a nuclear spin of not less than 3/2;

an anti-Helmholtz coil configured to apply a magnetic field to an inside of the vacuum vessel;

a laser generator configured to generate a laser beam including a first laser beam detuned from a first resonance frequency when the atom transits from a total angular momentum quantum number F in a ground state related to a hyperfine structure to a total angular momentum quantum number F'=F+1 in an excited state related to the hyperfine structure, and a second laser beam detuned from a second resonance frequency when the atom transits from the total angular momentum quantum number F in the ground state related to the hyperfine structure to a total angular momentum quantum number F'=F−1 in the excited state related to the hyperfine structure, among transitions of the atom from a total angular momentum quantum number J=0 in a ground state related to a fine structure to a total angular momentum quantum number J'=1 in an excited state related to the fine structure, by multiplexing the first laser beam and the second laser beam; and an irradiation device configured to irradiate the laser beam generated by the laser generator toward one point inside the vacuum vessel from a plurality of directions including at least a pair of opposite directions, and to simultaneously make the first laser beam trap the atom in a state that a magnetic quantum number is negative, and the second laser beam trap the atom in a state that the magnetic quantum number is positive, wherein the atom is a 173 ytterbium atom, and wherein the laser generator is configured to generate, as the first laser beam, a laser beam detuned from the first resonance frequency when the 173 ytterbium atom transits from a total angular momentum quantum number F=5/2 in the ground state related to the hyperfine structure to a total angular momentum quantum number F'=7/2 in the excited state related to the hyperfine structure, and generate, as the second laser beam, a laser beam detuned from the second resonance frequency when the 173 ytterbium atom transits from the total angular momentum quantum number F=5/2 in the ground state related to the hyperfine structure to a total angular momentum quantum number F'=3/2 in the excited state related to the hyperfine structure.

4. The magneto-optical trap apparatus according to claim 3, wherein the irradiation device includes a wave plate configured to convert the laser beam into one of a $\sigma^-$ polarized beam and a $\sigma^+$ polarized beam.

* * * * *